(12) United States Patent
Kelly et al.

(10) Patent No.: US 6,641,929 B2
(45) Date of Patent: Nov. 4, 2003

(54) ARTICLE HAVING A SUPERALLOY PROTECTIVE COATING, AND ITS FABRICATION

(75) Inventors: Thomas Joseph Kelly, Cincinnati, OH (US); P. Kennard Wright, III, Cincinnati, OH (US)

(73) Assignee: General Electric Co., Cincinnati, OH (US)

( * ) Notice: Subject to any disclaimer, the term of this patent is extended or adjusted under 35 U.S.C. 154(b) by 0 days.

(21) Appl. No.: 09/944,707

(22) Filed: Aug. 31, 2001

(65) Prior Publication Data

US 2003/0044634 A1 Mar. 6, 2003

(51) Int. Cl.[7] .................. B32B 15/04; C23C 16/06; C22C 19/05
(52) U.S. Cl. .................. 428/632; 428/651; 428/655; 428/680; 427/456; 427/252; 148/428; 420/445
(58) Field of Search .................. 148/409, 410, 148/426, 427, 428, 429; 428/615, 621, 622, 623, 629, 632, 633, 651, 655, 680; 427/249.1, 250, 252, 421, 455, 456, 497; 420/445, 448

(56) References Cited

U.S. PATENT DOCUMENTS

| | | | |
|---|---|---|---|
| 5,151,249 A | * | 9/1992 | Austin et al. |
| 5,270,123 A | * | 12/1993 | Walston et al. |
| 5,334,263 A | | 8/1994 | Schaeffer |
| 5,455,120 A | * | 10/1995 | Walston et al. |
| 5,482,789 A | | 1/1996 | O'Hara et al. |
| 5,598,968 A | * | 2/1997 | Schaeffer et al. |
| 5,695,821 A | * | 12/1997 | Murphy et al. |
| 5,891,267 A | * | 4/1999 | Schaeffer et al. |
| 5,935,353 A | | 8/1999 | Murphy et al. |
| 6,444,053 B1 | * | 9/2002 | Spitsberg et al. |
| 6,447,932 B1 | * | 9/2002 | O'Hara et al. |
| 6,468,367 B1 | * | 10/2002 | Mukira et al. |
| 6,471,790 B1 | * | 10/2002 | Fernihough |

* cited by examiner

Primary Examiner—Deborah Jones
Assistant Examiner—Jennifer McNeil

(57) ABSTRACT

An article protected by a protective coating includes a substrate made of a first nickel-base superalloy substrate material that is susceptible to the formation of a secondary reaction zone when overlaid by a diffusion aluminide coating or an aluminide overlay coating. A protective coating including a deposited coating at the substrate surface. The deposited coating is a second nickel-base superalloy different from the first nickel-base superalloy and which does not produce a secondary reaction zone when interdiffused with the first nickel-base superalloy. In one version, the deposited coating has a nominal composition, in weight percent, of about 3.1 percent cobalt, about 7.6 percent chromium, about 7.8 percent aluminum, about 5.45 percent tantalum, about 3.85 percent tungsten, about 1.65 percent rhenium, about 0.02 percent carbon, about 0.016 percent hafnium, about 0.015 percent boron, about 0.5 percent silicon, balance nickel and incidental impurities. A ceramic thermal barrier coating may overlie the protective-coating outer surface.

20 Claims, 3 Drawing Sheets

ARTICLE HAVING A SUPERALLOY PROTECTIVE COATING, AND ITS FABRICATION

STATEMENT REGARDING FEDERALLY SPONSORED RESEARCH OR DEVELOPMENT

This invention was made with Government support under N00019-96-C-0176 awarded by the Department of the Navy. The Government has certain rights in this invention.

This invention relates to an article having a superalloy protective coating and, more particularly, to such an article that resists the formation of a secondary reaction zone.

BACKGROUND OF THE INVENTION

A protective coating system may be used to protect the components of a gas turbine engine that are subjected to the highest temperatures. The protective coating system includes a protective coating that is deposited upon a superalloy substrate, and optionally a ceramic thermal barrier coating that is deposited upon the protective coating. The protective coating inhibits oxidation and corrosion of the substrate, and also bonds the ceramic thermal barrier coating, where present, to the substrate. The thermal barrier coating acts as a thermal insulator against the heat of the hot combustion gas. Where there is no thermal barrier coating present, the protective coating is termed an "environmental coating"; where there is a thermal barrier coating present, the protective coating is termed a "bond coat". Examples of protective coatings include diffusion aluminides such as platinum aluminides and overlay coatings such as MCrAlX coatings.

The protective coating is typically rich in aluminum. Upon oxidation, the protective coating forms an alumina protective scale on its outwardly facing surface. Other oxides such as chromia may also be present, if the protective coating is also rich in the elements that form these other oxides. The protective scale inhibits further oxidation of the underlying structure and serves as a barrier against corrosion.

However, it has been observed that the presence of aluminum and other elements in the protective coating may in some cases lead to degradation of the underlying substrate after exposure of the structure to the operating temperatures experienced in gas turbine engines. See, for example, U.S. Pat. Nos. 5,334,263 and 5,935,353, whose disclosures are incorporated by reference in their entireties. Aluminum diffusing into the substrate may result in the formation of a secondary reaction zone (SRZ) that embrittles and otherwise degrades the properties of the substrate in the SRZ. The SRZ typically extends from about 0.002 to about 0.010 inches into the substrate, but even this depth of property degradation is highly significant in thin-walled components. Internally cooled gas turbine blades may have wall thicknesses as small as about 0.020 inch, so the SRZ formation may degrade the properties over as much as half of the thickness of the wall.

The approaches to addressing the SRZ problem disclosed in the '263, '353, and other patents are all operable in their particular circumstances. However, in other circumstances they may not be successful in avoiding the formation of an SRZ. There remains a need for solutions to the SRZ problem in these other circumstances. The present invention fulfills this need, and further provides related advantages.

SUMMARY OF THE INVENTION

The present approach provides an article protected by a protective coating, and a fabrication method for preparing such an article. The protective coating is highly oxidation- and corrosion resistant. The protective coating may be used as an environmental coating or as a bond coat for a thermal barrier coating. The protective coating may be applied by known techniques. The protected article has little or no susceptibility to the formation of a secondary reaction zone when the substrate and the protective coating interdiffuse.

In one embodiment, an article protected by a protective coating comprises a substrate having a substrate surface. The substrate is made of a first nickel-base superalloy substrate material that is susceptible to the formation of a secondary reaction zone when overlaid by a diffusion aluminide coating or an aluminide overlay coating. A protective coating overlies the substrate surface. The protective coating includes a deposited coating having a protective coating outer surface. The protective coating comprises a second nickel-base superalloy different from the first nickel-base superalloy, and which does not produce a secondary reaction zone when interdiffused with the first nickel-base superalloy. A ceramic thermal barrier coating may overlie the protective coating outer surface. Preferably, the article is a component of a gas turbine engine such as a turbine blade, a turbine vane, or a turbine shroud.

The deposited coating preferably has a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities. A preferred nominal composition, in weight percent, is about 3.1 percent cobalt, about 7.6 percent chromium, about 7.8 percent aluminum, about 5.45 percent tantalum, about 3.85 percent tungsten, about 1.65 percent rhenium, about 0.02 percent carbon, about 0.016 percent hafnium, about 0.015 percent boron, about 0.5 percent silicon, balance nickel and incidental impurities.

In one specific and preferred embodiment, the substrate has a composition of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.15 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. This composition is subject to the formation of the SRZ when protected by diffusion aluminide or aluminide overlay coatings.

In another embodiment, an article protected by a protective coating comprises a substrate, preferably a nickel-base superalloy, having a substrate surface, and a deposited coating overlying the substrate surface. The deposited coating has the nominal composition set forth above. The other features set forth above may be used with this embodiment, where compatible.

A method of fabricating an article protected by a protective coating comprises the steps of providing a substrate having a substrate surface, and applying a protective coating, including a deposited coating, to the substrate surface. The substrate and the deposited coating are as described above. The deposited coating is preferably deposited by a spray process or a physical vapor deposition process. The deposited coating may thereafter be controllably oxidized, and/or a ceramic thermal barrier coating may be deposited overlying the protective coating outer surface.

In the present approach, the deposited coating is typically not highly alloyed with aluminum and other elements that cause the formation of an SRZ in otherwise-susceptible substrate alloys. As discussed in the '263, '353, and other patents, the susceptibility of a particular substrate alloy is determined in a straightforward manner by depositing a candidate protective-coating material onto the surface of the substrate alloy, heating this diffusion couple to cause interdiffusion to occur, and observing whether an SRZ forms. In the present approach, there is no SRZ formation under these circumstances, yet the protective coating has good oxidation and corrosion resistance and adheres well to the substrate in its role as an environmental coating. The protective coating performs these functions and also may serve as a bond coat for an overlying thermal barrier coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 2:
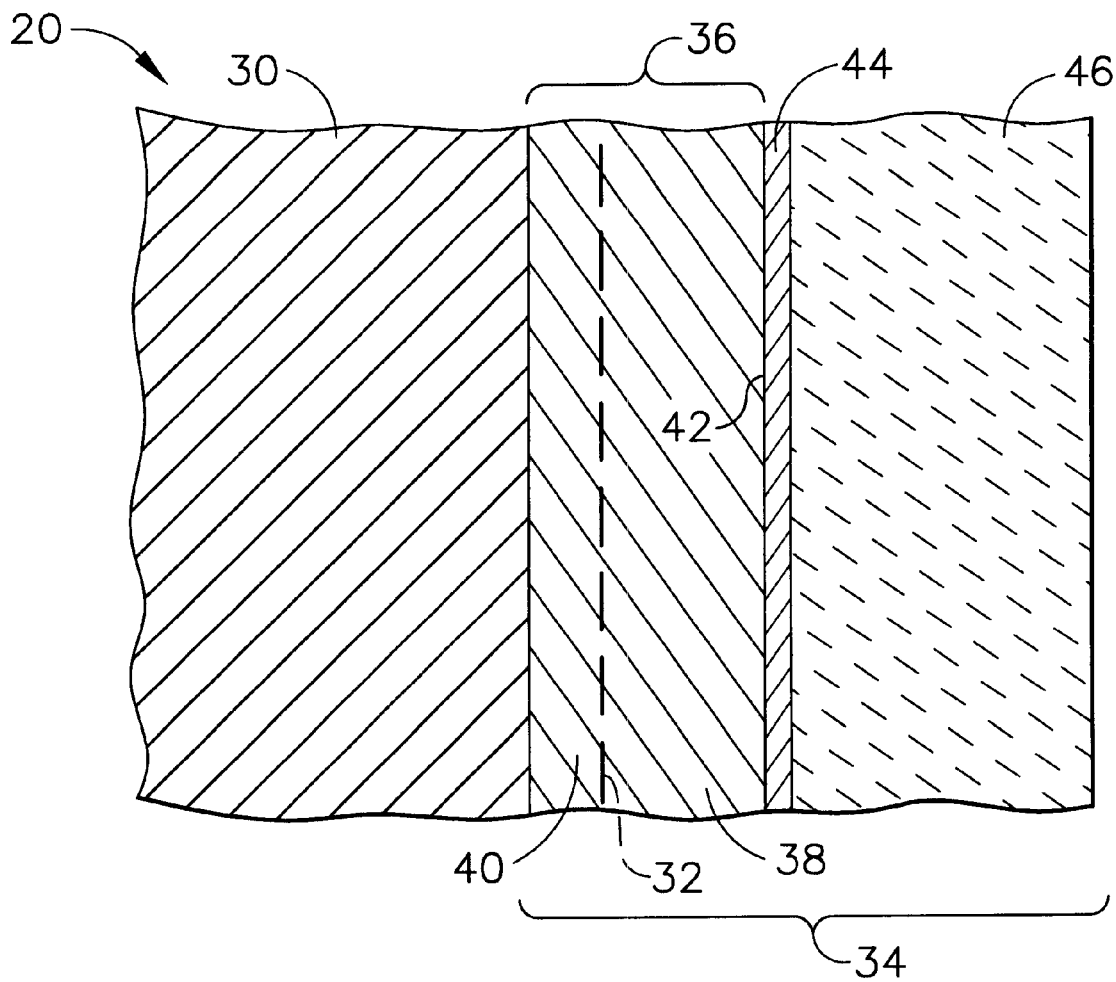
FIG. 2 is an enlarged schematic sectional view through the turbine blade of FIG. 1, taken on lines 2—2.

FIG. 2 is a schematic sectional view, not drawn to scale, through a portion of the turbine blade 20, here the airfoil section 22. The turbine blade 20 has a body that serves as a substrate 30 with a surface 32. Overlying and contacting the surface 32 of the substrate 30, and also extending downwardly into the substrate 30, is a protective coating system 34 including a protective coating 36. In the absence of an overlying ceramic thermal barrier coating, the protective coating 36 is termed an environmental coating. Where there is an overlying thermal barrier coating, the protective coating 36 is termed a bond coat. The protective coating 36 includes a deposited coating 38 and a diffusion zone 40 that is the result of interdiffusion of material of the deposited coating 38 and material from the substrate 30. The process that deposits the deposited coating 38 onto the surface 32 of the substrate 30 is performed at elevated temperature, so that during deposition the material of the deposited coating 38 interdiffuses into and with the material of the substrate 30, forming the diffusion zone 40. Additional interdiffusion occurs during service. The diffusion zone 40, indicated by a dashed line in Figure 2, is a part of the protective coating 36 but extends downward into the substrate 30.

The protective coating 36 has an outwardly facing protective coating outer surface 42 remote from the surface 32 of the substrate 30. An alumina (aluminum oxide, or $Al_2O_3$) scale 44 forms at this protective coating outer surface 42 by oxidation of the aluminum in the protective coating 36 at the protective coating outer surface 42. A ceramic thermal barrier coating 46 optionally overlies and contacts the protective coating outer surface 42 and the alumina scale 44 thereon.

The protective coating 36 has an outwardly facing protective coating outer surface 42 remote from the surface 32 of the substrate 30. An alumina (aluminum oxide, or $Al_2O_3$) scale 44 forms at this protective coating outer surface 42 by oxidation of the aluminum in the protective coating 36 at the protective coating surface 40. A ceramic thermal barrier coating 46 optionally overlies and contacts the protective coating outer surface 42 and the alumina scale 44 thereon.

Figure 1:
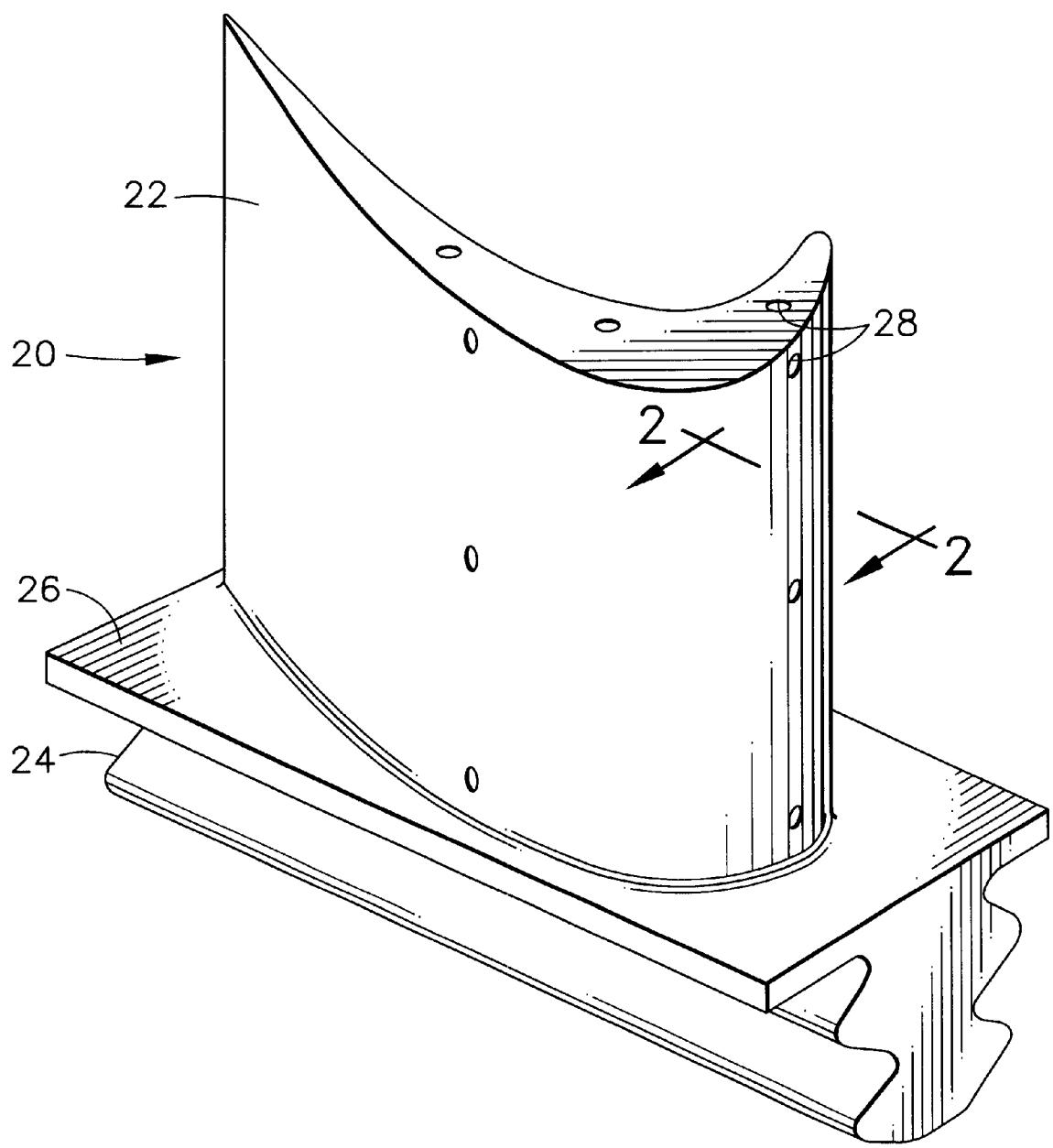
FIG. 1 is a perspective view of a turbine blade.
Figure 3:
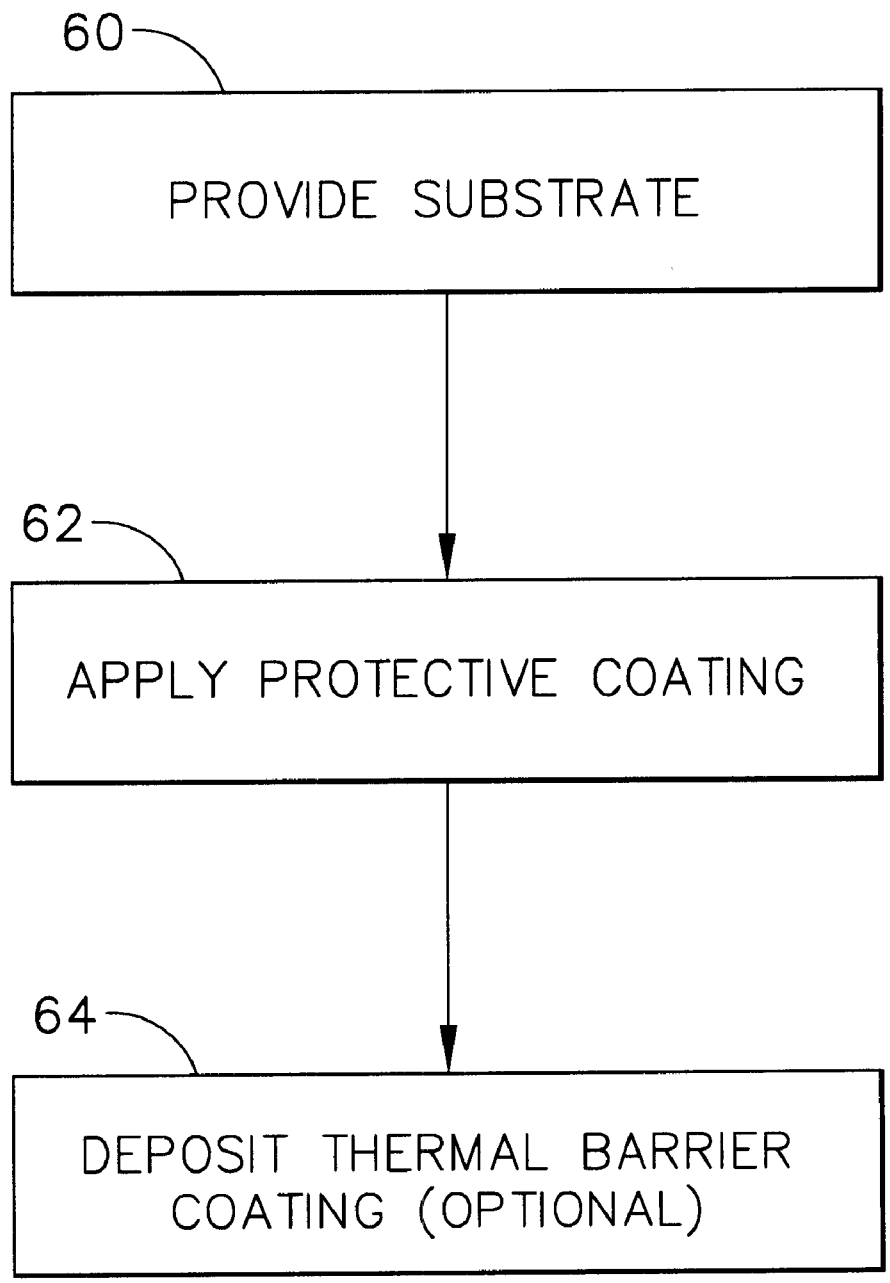
FIG. 3 is a block flow diagram of an approach for preparing a coated gas turbine airfoil.

FIG. 3 is a block flow diagram of a preferred approach for fabricating an article. An article and thence the substrate 30 are provided, numeral 60. The article is preferably a component of a gas turbine engine such as a gas turbine blade 20 (FIG. 1), or turbine vane (or "nozzle", as the turbine vane is sometimes called), or a turbine shroud. The article may be a single crystal article, a preferentially oriented polycrystal, or a randomly oriented polycrystal. The article is most preferably made of a first nickel-base superalloy. As used herein, "nickel-base" means that the composition has mole nickel present than any other element. The nickel-base superalloys are of a composition that is strengthened by the precipitation of gamma-prime phase or related phases.

The material constituting the substrate is susceptible to the formation of a secondary reaction zone (SRZ) when interdiffused with coatings that have a high aluminum content or a high content of other alloying elements. The material of the substrate typically has a high level of solutes in the superalloy gamma-phase matrix, so that the presence of additional alloying elements leads to precipitation of undesirable phases upon extended exposure to the operating temperatures of the gas turbine engine. An example of such a nickel-base superalloy is the alloy MX-4, which has a nominal composition, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.15 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to the MX-4 alloy, which is disclosed in U.S. Pat. No. 5,482,789, and has broader applicability. It is applicable to other nickel-base superalloys that are susceptible to the formation of SRZ. It is applicable to other alloys as well, but its greatest advantages are realized when it is used with the nickel-base superalloys that are susceptible to the formation of SRZ.

The protective coating 36 is applied, number 62, by first depositing the deposited coating 38, and then interdiffusing the deposited coating 38 and the substrate 30 to form the diffusion zone 40. The deposited coating 38 is preferably a second nickel-base superalloy, different from the first nickel-base superalloy of the substrate 30. The second nickel-base superalloy is selected such that the interdiffusion of the first nickel-base superalloy and the second nickel-base superalloy does not result in an interdiffusion region, such as in the diffusion zone 40, that is susceptible to the formation of SRZ after extended exposure at elevated temperature. That is, there will always be a diffusion zone 40 as a result of the interdiffusion of the two nickel-base superalloys at elevated temperatures. In the present case, the interdiffused composition of the diffusion zone 40 is not susceptible to the formation of SRZ.

To form the protective coating 36, the deposited coating 38 is applied, usually by deposition, and then interdiffused with the substrate 30. The deposited coating 38 preferably has a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities. The preferred nominal composition, in weight percent, of about 3.1 percent cobalt, about 7.6 percent chromium, about 7.8 percent aluminum, about 5.45 percent tantalum, about 3.85 percent tungsten, about 1.65 percent rhenium, about 0.02 percent carbon, about 0.016 percent hafnium, about 0.015 percent boron, about 0.5 percent silicon, balance nickel and incidental impurities. The deposition of the deposited coating 38 is preferably performed using the material of the deposited coating 38 in a powder form. The deposition may be, for example, by a spray process such as a high-velocity oxyfuel (HVOF) or plasma spray, or by a physical vapor deposition process such as electron beam physical vapor deposition (EBPVD). These deposition techniques are known in the art for other applications. The deposited coating 38 is preferably from about 0.001 to about 0.015 inch thick.

The substrate 30 with the protective coating 36 may be used without a ceramic thermal barrier coating 46, so that the protective coating 36 is an environmental coating. Optionally for use in higher-temperature applications, the ceramic thermal barrier coating 46 is deposited, numeral 64, overlying the protective coating outer surface 42 and any alumina scale 44 that has formed thereon, numeral 68. In this case, the protective coating serves as a bond coat. The ceramic thermal barrier coating 46 is preferably from about 0.003 to about 0.025 inch thick, most preferably about 0.005 inch thick. The ceramic thermal barrier coating 46 is preferably yttria-stabilized zirconia (YSZ), which is zirconium oxide containing yttrium oxide that stabilizes the phase structure of the zirconium oxide. The ceramic thermal barrier coating 46 may be deposited by any operable technique, such as electron beam physical vapor deposition or plasma spray.

Oxidation tests were performed in Mach 1 burner rig testing over a range of from 2100° F. to 2300° F. At 2150° F., for example, the average material loss per hour for the preferred protective coating material described above was about ⅓₀ that of the preferred substrate material (MX-4 alloy) described above, and was the lowest average material loss per hour of any nickel-base superalloy tested. The oxidation resistance of the preferred protective coating material was nearly as good as that of a platinum aluminide protective coating, which of course cannot be used with the preferred substrate material in many applications because of the formation of the SRZ. Other testing showed that the interdiffusion of this preferred protective coating material and alloys otherwise subject to the formation of SRZ, such as the preferred substrate material discussed above, did not lead to the formation of an SRZ.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article protected by a protective coating, comprising:
    a substrate having a substrate surface, wherein the substrate is made of a first nickel-base superalloy substrate material that is susceptible to the formation of a secondary reaction zone when overlaid by a diffusion aluminide coating or an aluminide overlay coating; and
    a protective coating at the substrate surface, the protective coating including a deposited coating having a protective coating outer surface and being a second nickel-base superalloy different from the first nickel-base superalloy and which does not produce a secondary reaction zone when interdiffused with the first nickel-base superalloy.

2. The article of claim 1, wherein the article is a component of a gas turbine engine.

3. The article of claim 1, wherein the substrate comprises an article selected from the group consisting of a turbine blade, a turbine vane, and a turbine shroud.

4. The article of claim 1, wherein the substrate has a composition of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.15 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities.

5. The article of claim 1, wherein the protective coating has a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities.

6. The article of claim 1, wherein the protective coating has a nominal composition, in weight percent, of about 3.1 percent cobalt, about 7.6 percent chromium, about 7.8 percent aluminum, about 5.45 percent tantalum, about 3.85 percent tungsten, about 1.65 percent rhenium, about 0.02 percent carbon, about 0.016 percent hafnium, about 0.015 percent boron, about 0.5 percent silicon, balance nickel and incidental impurities.

7. The article of claim 1, wherein the substrate has a nominal composition of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.15 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities, and wherein the protective coating has a nominal composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities.

8. The article of claim 1, further including
a ceramic thermal barrier coating overlying the protective-coating outer surface.

9. An article protected by a protective coating, comprising:
a substrate having a substrate surface, wherein the substrate is made of a nickel-base superalloy substrate material that is susceptible to the formation of a secondary reaction zone when overlaid by a diffusion aluminide coating or an aluminide overlay coating; and
a deposited coating at the substrate surface, the deposited coating having a protective coating outer surface and a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hathium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities, wherein
there is no secondary reaction zone formed by interdiffusion between the substrate and the deposited coating.

10. The article of claim 9, wherein the substrate is made of a substrate material that is susceptible to the formation of a secondary reaction zone when overlaid by a diffusion aluminide coating or an aluminide overlay coating.

11. The article of claim 9, wherein the substrate comprises a nickel-base superalloy.

12. The article of claim 9, wherein the substrate has a nominal composition of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.15 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities.

13. The article of claim 9, wherein the article is a component of a gas turbine engine.

14. The article of claim 9, wherein the substrate comprises an article selected from the group consisting of a turbine blade, a turbine vane, and a turbine shroud.

15. The article of claim 9, further including
a ceramic thermal barrier coating overlying the protective-coating outer surface.

16. A method of fabricating an article protected by a protective coating comprising the steps of:
providing a substrate having a substrate surface, wherein the substrate is made of a nickel-base superalloy substrate material that is susceptible to the formation of a secondary reaction zone when overlaid by a diffusion aluminide coating or an aluminide overlay coating; and
applying a deposited coating to the substrate surface, the deposited coating having a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities, wherein
there is no secondary reaction zone formed by interdiffusion between the substrate and the deposited coating.

17. The method of claim 16, wherein the step of providing the substrate includes the step of
providing the substrate comprising a nickel-base superalloy.

18. The method of claim 16, including an additional step, after the step of applying the deposited coating, of
depositing a ceramic thermal barrier coating overlying an outer surface of the deposited coating.

19. A method of fabricating an article protected by a protective coating comprising the steps of:
providing a substrate having a substrate surface; and
applying a deposited coating to the substrate surface, the deposited coating having a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities, wherein the step of applying the deposited coating includes a step of depositing the deposited coating by a spray process.

20. A method of fabricating an article protected by a protective coating comprising the steps of:
providing a substrate having a substrate surface; and
applying a deposited coating to the substrate surface, the deposited coating having a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities, wherein the step of applying the deposited coating includes a step of depositing the deposited coating by a physical vapor deposition process.

* * * * *